United States Patent [19]

Mederer et al.

[11] Patent Number: 5,109,302
[45] Date of Patent: Apr. 28, 1992

[54] VIDEO RECORDING DEVICE

[75] Inventors: Werner Mederer, Lauf; Reinhard Stacho, Neumarkt; Egbert Spanner; Michael Borgelt, both of Nuremberg, all of Fed. Rep. of Germany

[73] Assignee: Grundig E.M.V. ElektroMechanische Versuchsanstalt Max Grundig Holland, Stiftung & Co., Fuerth/Bay, Fed. Rep. of Germany

[21] Appl. No.: 510,054

[22] Filed: Apr. 17, 1990

[30] Foreign Application Priority Data

Jun. 5, 1989 [DE] Fed. Rep. of Germany ....... 3918264

[51] Int. Cl.$^5$ .................................................. G11B 5/02
[52] U.S. Cl. ..................................... 360/19.1; 360/13
[58] Field of Search ..................... 360/18, 19.1, 13, 61

[56] References Cited

U.S. PATENT DOCUMENTS

| 4,688,110 | 8/1987 | Fricke | 360/19.1 |
| 4,849,831 | 7/1989 | Hino | 360/19.1 |
| 4,939,605 | 7/1990 | Heitmann et al. | 360/19.1 |

Primary Examiner—David J. Severin
Attorney, Agent, or Firm—Kane, Dalsimer, Sullivan, Kurucz, Levy, Eisele and Richard

[57] ABSTRACT

A video recorder device for electronic cutting of video and FM-audio signals in oblique tracks of a magnetic tape wherein the audio signal is also recorded in a longitudinal track at the tape edge, whereupon erasing the original video signal in the oblique track also results in the undesired erasing of the original FM-audio signal also in the oblique track which is replaced by the audio signal recorded in the longitudinal track being recorded in the oblique track.

7 Claims, 1 Drawing Sheet

VIDEO RECORDING DEVICE

FIELD OF THE INVENTION

The invention relates to a video recorder which includes a means of electronic cutting of video and FM-audio signals in oblique tracks of a magnetic tape.

BACKGROUND OF THE INVENTION

In the publication "Funk-Technik", 1983, Heft 12 pages 498-500, there are discussed video recorders which involve recording video and FM-audio signals in oblique tracks in a magnetic tape. In this regard, the penetration depth of the magnetization of the magnetic tape corresponding to the video signal is lower than the penetration depth of the magnetization of the magnetic tape corresponding to the audio signal. The audio signal is also recorded on a longitudinal track at the edge of the magnetic tape. This is to assure the compatibility of the magnetic tape with conventional video recorders which do not record or playback FM-audio signals when they are recorded in the oblique tracks. Rather such video recorders use the longitudinal track for audio recording and playback.

During the playback of a recorded magnetic tape cassette some video recorders automatically switch over through the use of a detector circuit between an audio playback from the oblique tracks which has a high audio quality and an audio playback from the longitudinal track which has a reduced audio quality. This circuit recognizes the presence or absence of an oblique track-FM-audio recording.

In DE-PS 34 21 197 and corresponding EP-A2 0 166 861 there is discussed the use of a video magnetic tape on which had been already recorded a FM-audio signal and the subsequently adding of a recording of a television signal without erasing the already recorded FM-audio signal. In this regard, the video signal is recorded with a lower penetration depth of magnetization in the oblique tracks of the magnetic tape. The associated audio signal is exclusively in a longitudinal track on the tape edge.

In addition in DE-PS 35 15 251 and DE-PS 32 23 151 video recorders are discussed which are provided with a device for electronic cutting of video signals in the oblique tracks of a magnetic tape. These devices are provided with rotating eraser heads which erase the video signals which are recorded in the oblique tracks at marked tape locations. These marked tape locations are marked by the user by means of a control unit, so that subsequently new video signals can be recorded in the erased oblique tracks by means of the rotating video heads. However in such devices recording of FM-audio signals is not provided.

While it is desireable to record the video and audio signals on magnetic tape, it is also desirable to avoid a situation which is the result of the video recorder during playback switching from the audio signal being read from the oblique tracks at one point and the longitudinal track at another point. Such switching results in undesired noise.

Accordingly there exists a need for a video recorder which allows the electronic cutting of video signals along with audio signals in the oblique track portion.

It is a further object to provide such a video recording device with such a feature through the use of a small amount of additional circuitry.

It is a yet further object to provide for such a feature which results in a low interference in the audio signal.

These objects are provided by the present invention through the use of a video recorder which allows for the recording of the video portion in the oblique tracks and the use of the audio signals in the longitudinal track to record FM-audio signals in the oblique tracks.

The advantages of the present invention are particularly apparent in the recording of video and FM-audio signals in what are commonly referred to as "HiFi-video recorders". In this regard, recording in the oblique tracks includes an FM-audio signal in addition to a video signal with a longitudinal track at the tape edge also being provided for the audio signal. For recording the present invention provides for audio signals in the longitudinal track on the tape edge to be recorded as FM-audio signals in the oblique tracks. As such during the playback of the audio signal it can be taken from the oblique tracks alone thus avoiding any switch over noises generated if the signal was taken from the oblique track-FM-recording and then the audio signal on longitudinal track playback and back again. This such switching back and forth is eliminated.

BRIEF DESCRIPTION OF THE DRAWING

Thus by the present invention its objects and advantages will be realized, the description of which should be taken in conjunction with the drawing wherein.

DETAILED DESCRIPTION OF THE PREFERRED EMBODIMENT

Figure 1:
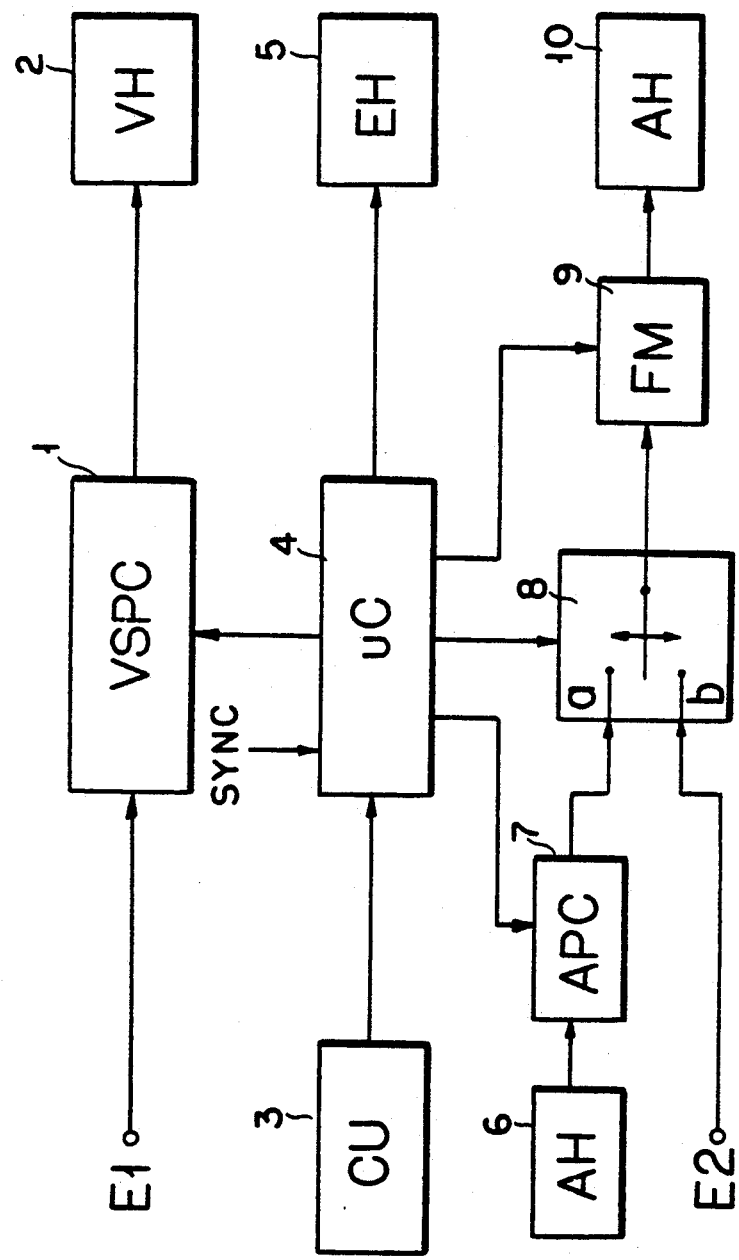
FIG. 1 depicts a block circuit diagram of the circuitry and attendant parts of a video recorder incorporating the teachings of the present invention.

Turning now more particularly to the drawing, FIG. 1 illustrates a block circuit diagram along with certain attendant structural parts of a video recorder involved in practicing the present invention. These parts as shown are: a video signal processing circuit 1, a video head unit 2 having rotating video heads, a control unit 3, a microcomputer 4, an eraser head unit 5 with one or more rotating eraser heads, a stationary audio head 6 for recording or playback of an audio signal on or from a longitudinal track at the edge of a magnetic tape, an audio playback circuit 7 for amplification and equalization of the audio signals played back by audio head 6, a selection switch 8, a frequency modulator 9 and an audio head unit 10 having rotating audio heads.

Turning now to the electronic cutting of video signals, the magnetic tape being recorded is the type which has the video and FM-audio signals recorded in the oblique tracks in addition to having the audio signal recorded at the tape edge. Assuming video and audio signals have already been recorded on the tape. The user would playback the already recorded video signal from the oblique tracks of the magnetic tape by means of the rotating video heads 2. The user then watches the played back video signal on the screen of a monitor (not shown) which is connected to the video recorder and enters the desired entering and exiting points of the video to be cut by way of the control unit 3. This information is then fed to the microcomputer 4 which controls the total recording process by using the fed synchronous signals from the new video signal to be recorded on the tape. This recording process is activated by a command from the control unit 3.

Initially, the microcomputer 4 signals the rotating eraser head 5 to erase the recorded signals in the oblique tracks in the space defined by the entry and exit recording points. However, in the erasing process of the recorded video signals in the oblique tracks, the FM-audio signals recorded in the oblique tracks are unfortunately erased as well.

Once the erasing is complete, the microcomputer 4 activates the audio playback circuit 7 and simultaneously moves the selection switch 8 into switch position a. As a result, the audio signals are played back from the longitudinal track on the edge of the magnetic tape and are applied to the frequency modulator 9 through selection switch 8 and are recorded as a replacement for the erased FM-audio signals in form of frequency modulated audio signals in the oblique tracks by means of the rotating audio heads 10.

Thereafter, the microcomputer 4 activates the video signal processing circuit 1 for processing of the new video signal. In this regard the video signal is fed into video signal processing circuit 1 via input EI, the output of which is fed to the rotating video heads 2 for recording in the oblique tracks. The recording of this video signal is performed in a manner as described previously in that the penetration depth of the magnetization corresponding to the video signal is lower than the penetration depth of the magnetization of the previously recorded audio signal.

Thus the present invention provides for the recording of the new video portion of the tape along with providing FM-audio in the oblique tracks. The audio quality which is available after the completion of the electronic cutting at the area of the insert may be somewhat reduced in comparison with FM-audio quality normally obtainable. However, the present invention advantageously avoids switch over noises generated by a switch over process between a oblique-FM-audio playback and a longitudinal-audio playback and vice versa. This means of electronic cutting is also advantageous in a video recorder with a long play mode of operation.

Thus by the present invention its objects and advantages are realized and although a preferred embodiment has been disclosed and described in detail herein, it scope should not be limited thereby rather its scope should be determined by that of the appended claims.

What is claimed is:

1. A video recorder device for electronic cutting video and FM-audio signals on a magnetic tape comprising:
   means for recording a video signal on a magnetic tape at a first location;
   means for recording a frequency modulated audio signal also at the first location wherein the penetration depth of the magnetization of the magnetic tape corresponding to the audio signal is different than the penetration depth of the magnetization of the magnetic tape corresponding to the video signal;
   erasing means for erasing said video signals on said magnetic tape;
   means for recording and playback of an audio signal in or from a second location on a magnetic tape and recording it on the magnetic tape in said first location; and
   wherein the recording the video signals at the first location results in erasure of the FM-audio signals located at said first location and audio signals are recorded which are at said first location generated from audio signals at said second location.

2. The device in accordance with claim 1 which includes a frequency modulator for frequency modulation of the audio signal at the second location to be recorded at said first location in FM format.

3. The device in accordance with claim 2 wherein said first location comprises oblique tracks on said magnetic tape and said second location comprises a longitudinal track on said magnetic tape.

4. A video recorder device for electronic cutting of video and FM-audio signals in oblique tracks, comprising:
   video signal processing circuit means for processing video signals;
   video head means for recording video signal in oblique tracks of a magnetic tape;
   frequency modulator means for frequency modulation of an audio carrier with an audio signal;
   first audio head means for recording a frequency modulated audio signal in the oblique tracks of the magnetic tape wherein the penetration depth of the magnetization of the magnetic tape corresponding to the audio signal is different than the penetration depth of the magnetization of the magnetic tape corresponding to the video signal;
   eraser head means for erasing video signals recorded in said oblique tracks;
   second audio head means for recording and playback of an audio signal in or from a longitudinal track of a magnetic tape;
   control means for indicating the desired location for recording video signals;
   microcomputer means for controlling the recording of the video signal; and
   switch means controlled by microcomputer means which in response to the control means feeds the audio signal from the longitudinal track of the magnetic tape to the frequency modulator means which in turn is fed to said first audio head means for recording said frequency modulated signal in the oblique tracks at the desired locations.

5. The device in accordance with claim 4 wherein said video, first audio and eraser heads means are rotating heads and said second audio head is stationary head.

6. A method of electronic cutting signals on magnetic tape having video and FM audio signals recorded in oblique tracks and a second audio signal located in a longitudinal track, comprising the steps of:
   erasing the video signal in the oblique tracks at predetermined locations wherein such erasure also causes an undesired erasure of the FM-audio signal located in the oblique tracks; and
   recording in the oblique tracks at the predetermined locations the audio signal located in the longitudinal track at said predetermined locations.

7. The method in accordance with claim 6 which includes the step of processing the audio signal located in the longitudinal track into frequency modulated format prior to recording in the oblique tracks.

* * * * *